United States Patent
Castellanos Zamora et al.

(10) Patent No.: US 10,341,846 B2
(45) Date of Patent: Jul. 2, 2019

(54) CONTROLLING IMPLEMENTATION OF SERVICES IN A MOBILE TELECOMMUNICATIONS NETWORK

(71) Applicant: Telefonaktiebolaget LM Ericsson (publ), Stockholm (SE)

(72) Inventors: David Castellanos Zamora, Madrid (ES); Santiago Muñoz Muñoz, Madrid (ES)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/776,515

(22) PCT Filed: Dec. 22, 2015

(86) PCT No.: PCT/EP2015/081074
§ 371 (c)(1),
(2) Date: May 16, 2018

(87) PCT Pub. No.: WO2017/108116
PCT Pub. Date: Jun. 29, 2017

(65) Prior Publication Data
US 2018/0332463 A1 Nov. 15, 2018

(51) Int. Cl.
*H04W 8/20* (2009.01)
*H04W 8/18* (2009.01)
(Continued)

(52) U.S. Cl.
CPC .............. *H04W 8/20* (2013.01); *H04W 8/18* (2013.01); *H04W 48/02* (2013.01); *H04W 48/12* (2013.01)

(58) Field of Classification Search
CPC ....... H04W 48/02; H04W 48/12; H04W 8/20; H04W 8/18
See application file for complete search history.

(56) References Cited

U.S. PATENT DOCUMENTS 6,591,105 B1 7/2003 Hussain et al.
8,799,490 B2 8/2014 Ayers et al.
(Continued)

OTHER PUBLICATIONS

International Search Report and Written Opinion dated Sep. 19, 2016 for International Application No. PCT/EP2015/081074 filed on Dec. 22, 2015, consisting of 11-pages.
(Continued)

*Primary Examiner* — Keith Ferguson
(74) *Attorney, Agent, or Firm* — Christopher & Weisberg, P.A.

(57) ABSTRACT

Methods and apparatus for controlling implementation of services in a mobile telecommunications network. A user database stores one or more user subscription profiles. Each user subscription profile is associated with services implemented in one or more network domains and includes a plurality of individual Operator Determined Barring indicators, ODBs, and respective status information. A network node includes a receiver configured to receive, from the user database, a user subscription profile, a master ODB indicating barring for a plurality of the services associated with the user subscription profile and master ODB status information. An ODB status determiner is configured to determine that the master ODB is active. An ODB initiator is configured to initiate, for the plurality of services, barring for all individual ODB indicators in the user subscription profile, irrespective of the received status information for the individual ODB indicators.

20 Claims, 5 Drawing Sheets

(51) Int. Cl.
*H04W 48/02* (2009.01)
*H04W 48/12* (2009.01)

(56) References Cited

U.S. PATENT DOCUMENTS

2004/0005881 A1* 1/2004 Ala-Luukko ........... H04L 51/12
455/422.1
2004/0234060 A1 11/2004 Tammi et al.

OTHER PUBLICATIONS

3GPP TS 23.015 v13.0.0; 3rd Generation Partnership Project; Technical Specification Group Core Network and Terminals; Technical realization of Operator Determined Barring (ODB); (Release 13); Dec. 2015, consisting of 32-pages.
3GPP TS 23.002 v13.2.0; 3rd Generation Partnership Project; Technical Specification Group Services and System Aspects; Network architecture; (Release 13); Jun. 2015, consisting of 110-pages.
3GPP TS 23335 v12.0.0; 3rd Generation Partnership Project; Technical Specification Group Core Network and Terminals; User Data Convergence (UDC); Technical realization and information flows; Stage 2; (Release 12); Sep. 2014, consisting of 39-pages.
3GPP TS 23.015 v12.1.0; 3rd Generation Partnership Project; Technical Specification Group Core Network and Terminals; Technical realization of Operator Determined Barring (ODB); (Release 12); Jun. 2015, consisting of 32-pages.
3GPP TS 24315 v12.1.0; 3rd Generation Partnership Project; Technical Specification Group Core Network and Terminals; IP Multimedia Subsystem (IMS) Operator Determined Barring (ODB); Stage 3: protocol specification; (Release 12); Dec. 2014, consisting of 14-pages.
3GPP TS 29328 v13.1.0; 3rd Generation Partnership Project; Technical Specification Group Core Network and Terminals; IP Multimedia (IM) Subsystem Sh interface; Signalling flows and message contents; (Release 13); Jun. 2015, consisting of 69-pages.

\* cited by examiner

CONTROLLING IMPLEMENTATION OF SERVICES IN A MOBILE TELECOMMUNICATIONS NETWORK

CROSS-REFERENCE TO RELATED APPLICATIONS

This application is a Submission Under 35 U.S.C. § 371 for U.S. National Stage Patent Application of International Application Number: PCT/EP2015/081074, filed Dec. 22, 2015 entitled "CONTROLLING IMPLENTATION OF SERVICES IN A MOBILE TELECOMMUNICATIONS NETWORK," the entirety of which is incorporated herein by reference.

TECHNICAL FIELD

This invention relates to methods and apparatus for controlling implementation of services in a mobile telecommunications network. More specifically, the invention relates to methods and apparatus for barring a plurality of services in the mobile telecommunications network. In exemplary embodiments, the network may include a User Data Convergence, UDC, architecture.

BACKGROUND

Currently, a user accessing different network domains and a plurality of services offered over those domains will be assigned different subscription profiles in the different network domains and the corresponding network elements. For example, a typical user with a 4G smartphone may be assigned the following subscription profiles:
  A Circuit Switched (CS) subscription granting access to a CS network domain and including profile settings for Voice/Short Message Service (SMS) while on CS coverage;
  A Packet Switched (PS) subscription granting access to General Packet Radio Service (GPRS) data networks; and
  An Evolved Packet System (EPS) subscription granting access to an EPS data network domain.
Additional subscription profiles may be assigned to the user with the introduction of Voice over LTE (VoLTE):
  An IP Multimedia System (IMS) subscription granting access to IMS service domain.
  A Multimedia Telephony (MMTel) subscription enabling MultiMedia Telephony service for the user.
  Additional subscriptions at different IMS Application Servers (AS) providing different type of services to the user (e.g. messaging, groups/presence, etc.).
Except for the subscription profiles required for the IMS ASs (including the MMTel AS) all of the subscription profiles required are defined in a Home Subscriber Server (HSS) as specified in 3GPP TS 23.002. The HSS typically provides two separate/independent network functions i.e. a Home Location Register (HLR) and a HSS.

In particular mobile telecommunications networks, such as those including a UDC architecture deployment as defined in 3GPP TS 23.335, all required subscription profiles could be stored in a back-end data base (e.g. a UDR) and be associated with a user (i.e. multi-service consumer).

Operator Determined Barring (ODB) allows a network operator or service provider to regulate subscriber access to services, such as Circuit/Packet Oriented, Interworking Wireless Local Area Network (I-WLAN) and IMS based services, by barring e.g. certain categories of incoming or outgoing calls, Packet Oriented Services, or roaming.

3GPP TSs 23.015 and 24.315 describe the realization of ODB in CS, PS, EPS, I-WLAN and IMS networks. According to these specifications, different types of ODB are defined, as set out below:
  Barring of Incoming/Outgoing Communications (including SMS). This includes one of barring all communications or barring communications under certain conditions, such as e.g. barring communications while roaming, barring premium rate communications and barring invocation of call transfer;
  Barring of roaming;
  Operator Specific Barring;
  Barring of Supplementary Service Management; and
  Barring of Packet Oriented Services.

Different types of ODB apply to different types of access networks and services. For example, Barring of Outgoing Communications applies to voice and messaging services provided in a CS network domain and IMS/MMTel, while Barring of Packet Oriented services applies to data services offered via PS, EPS and I-WLAN network domains.

Different ODB types are controlled and administered by the network operator or service provider using administrative interaction with the HSS/HLR and IMS ASs. However, standards do not define either the administrative interactions, or the actual structure of the ODB types within the user profiles.

Typically, different ODB types are defined within the corresponding subscription profile in HLR, HSS-EPS, HSS-IMS and IMS-AS, wherein the different ODB types may be represented by a corresponding number of individual ODB indicators (ODBs) and a sort of status or flag indicating whether activated or inactivated.

When activated, and depending on the type of ODB or domain, ODBs may be invoked at an HSS, HLR, or AS. ODBs may also be invoked at an application front end (FE) node (e.g. a HSS-FE, a HLR-FE, Multimedia Telephony Application Server (MTAS) or other AS of a UDC architecture, which may be termed front end nodes. ODBs may also be invoked at a serving node (e.g. Mobile Switching Centre (MSC), Serving GPRS Support Node (SGSN), Mobile Management Entity (MME), Call Session Control Function (CSCF)) depending on the type of ODB or network domain. For example, an ODB related to barring of originating communications in a CS network domain is invoked at the MSC.

The term "network node" is used herein to encompass HSSs, HLRs, ASs, FE nodes and serving nodes.

U.S. Pat. No. 8,799,490 B2 discloses a HSS Logic node connected with a permissions database and a user database, and also connected with a plurality of AS nodes. The permissions database includes, on a per AS basis, a number of permissions for a corresponding number of messages that can be received from the AS concerned. The permissions database is updated by the HSS as a result of messages received from the AS nodes.

US20040234060 A1 is directed to a method and system for deactivating a service account and discloses a barring indicator intended to bar and/or de-register a user in an IMS network. This barring indicator is sent from an AS, to which a service account for the user is associated and which monitors said service account, to a registration server, which maintains a registration status for the user. The registration server in this application corresponds to an IMS HSS receiving the barring indicator over the Sh interface from the IMS AS. That is, a barring of a user account is triggered from the AS to the HSS as a result of monitoring the account at the AS.

SUMMARY

The inventors have appreciated that ODB Management for subscribers accessing multiple services over multiple network access domains becomes cumbersome, especially when a quick method to activate and restore barring settings across multiple services is required.

For example, when an operator would like to apply an immediate barring of all services subscribed to a user, e.g. due to a billing conflict with the end-user, the operator will have to send individual administrative requests to each network element in order to update the ODB settings of the corresponding subscription profiles. In other words, e.g. for a UDC architecture, the operator will have to issue individual requests to update: CS related ODBs and PS related ODBs in the HLR, EPS; IMS related ODBs in the HSS; and MMTel related ODBs in a MTAS.

When the conflict with the end-user is resolved and the operator would like to enable the services to the end-user, the operator will have to issue the same amount of individual administrative requests to restore the services and their corresponding ODBs to those originally prescribed.

Additionally, the inventors have appreciated that when the ODB indicator status information is updated, the original ODB indicator status information is lost, that is, for example, the original status information for an ODB to bar outgoing International communications is overwritten when an ODB for all outgoing communication is activated. Therefore, in order to restore the original ODB status information, the operator will have to record the original ODB status information for the user for reinstatement later. Furthermore, the operator is responsible for the ODB status information and for ensuring that all requests (to activate and later on to reinstate original ODBs) are successfully executed. Otherwise the expected effect may not be achieved.

Even if a Provisioning System is used to automate and orchestrate the administrative burden of handling ODBs in the scenario described above, the complexity is not reduced, it is simply moved from the operator to the Provisioning System to be handled on behalf of the operator. Furthermore, the restoration of the original ODB status information is not resolved by the Provisioning System, unless the Provisioning System is able to keep track of what the previous settings were.

According to the invention in an aspect, there is provided a network node for controlling implementation of services in a mobile telecommunications network. The mobile telecommunications network comprises a user database for storing one or more user subscription profiles. Each user subscription profile is associated with services implemented in one or more network domains and comprising a plurality of individual Operator Determined Barring indicators, ODBs, and respective status information, for the services associated with the user subscription profile. The network node comprises a receiving means, which may be a receiver, configured to receive, from the user database, a user subscription profile, a master ODB indicating barring for a plurality of the services associated with the user subscription profile and master ODB status information. The network node comprises an ODB status determining means, which may be an ODB status determiner, configured to determine that the master ODB is active based on the received master ODB status information. The network node comprises an ODB initiating means, which may be an ODB initiator configured to initiate, for the plurality of services, barring for all individual ODB indicators in the user subscription profile, irrespective of the received status information for the individual ODB indicators.

The initiation of barring for all of the individual ODB indicators may be based on the master ODB and/or master ODB status information.

Optionally, the network node further comprises a transmitting means, which may be a transmitter, configured to transmit a request for the user subscription profile, to the user database, wherein the receiver is configured to receive the user subscription profile, the master ODB and the master ODB status information in response to the transmitted request.

Optionally, the master ODB indicates barring for all services associated with the user subscription profile.

Optionally, the user database is a User Data Repository, UDR, of a User data Convergence, UDC, architecture, and wherein the network node is an application front end node of the UDC architecture.

Optionally, the network node comprises the user database as an internal database, and wherein the network node is one of a Home Subscriber Server, HSS, a Home Locator Register, HLR, a Multimedia Telephony Application Server, MTAS, or other Application Server, AS.

Optionally, the ODB initiator is configured to initiate barring by controlling a transmitter to transmit to a serving node, all individual ODB indicators in the user subscription profile that are invoked at the serving node, with new respective statuses set to active, irrespective of the status information of the individual ODB indicators received in the user subscription profile.

Optionally, the ODB initiator is configured to initiate barring by controlling a transmitter to transmit, towards a serving node, the master ODB.

Optionally, the serving node is one of a Mobile Switching Centre, MSC, a Serving General Packet Radio Service Support Node, SGSN, a Mobile Management Entity, MME, a Call Session Control Function, CSCF, or a Visitor Location Register, VLR.

Optionally, the ODB initiator is configured to initiate barring by implementing all individual ODB indicators in the user subscription profile that are invoked at the network node, as if they were active, irrespective of the status information of the individual ODB indicators received in the user subscription profile.

Optionally, the receiver is configured to receive the user subscription profile, the master ODB and the master ODB status information from one of: an application front end node of a UDC architecture; a HSS; a HLR; a MTAS; or other AS. Optionally, the ODB initiator is configured to initiate barring by implementing all individual ODB indicators in the user subscription profile that are invoked at the network node, as if they were active, irrespective of the status information of the individual ODB indicators received in the user subscription profile.

Optionally, the ODB initiator is configured such that the status information for the individual ODB indicators received in the user subscription profile remains unaltered after initiation of barring by the ODB initiator.

According to the invention in another aspect, there is provided a method for use in a network node for controlling implementation of services in a mobile telecommunications network. The mobile telecommunications network comprises a user database for storing one or more user subscription profiles, each user subscription profile associated with services implemented in one or more network domains and comprising a plurality of individual Operator Determined Barring indicators, ODBs, and respective status information, for the services associated with the user subscription profile. The method comprises receiving, by a receiver from the user database, a user subscription profile, a master ODB indicating barring for a plurality of the services associated with the user subscription profile, and master ODB status information. The method comprises determining, by a master ODB status determiner, that the master ODB is active based on the received master ODB status information. The method comprises initiating, by an ODB initiator, for the plurality of services, barring for all individual ODB indicators in the user subscription profile irrespective of the received status information for the individual ODB indicators.

Optionally, the method further comprises transmitting, by a transmitter of the network node, a request for the user subscription profile, to the user database, wherein the receiver is configured to receive the user subscription profile, the master ODB and the master ODB status information in response to the transmitted request.

Optionally, the master ODB indicates barring for all services associated with the user subscription profile.

Optionally, the user database is a User Data Repository, UDR, of a User data Convergence, UDC architecture, and wherein the network node is an application front end node of the UDC architecture.

Optionally, the network node comprises the user database as an internal database, and wherein the network node is one of a Home Subscriber Server, HSS, a Home Locator Register, HLR, a Multimedia Telephony Application Server, MTAS, or other Application Server, AS.

Optionally, the ODB initiator initiates barring by controlling a transmitter to transmit to a serving node, all individual ODB indicators in the user subscription profile that are invoked at the serving node, with new respective statuses set to active, irrespective of the status information of the individual ODB indicators received in the user subscription profile.

Optionally, the ODB initiator initiates barring by controlling a transmitter to transmit, towards a serving node, the master ODB.

Optionally, the serving node is one of a Mobile Switching Centre, MSC, a Serving General Packet Radio Service Support Node, SGSN, a Mobile Management Entity, MME, a Call Session Control Function, CSCF, or a Visitor Location Register, VLR.

Optionally, the ODB initiator initiates barring by implementing all individual ODB indicators in the user subscription profile that are invoked at the network node, as if they were active, irrespective of the status information of the individual ODB indicators received in the user subscription profile.

Optionally, the receiver of the network node receives the user subscription profile, the master ODB and the master ODB status information from one of: an application front end node of a UDC architecture; a HSS; a HLR; a MTAS; or other AS. Optionally, the ODB initiator initiates barring by implementing all individual ODB indicators in the user subscription profile that are invoked at the network node, as if they were active, irrespective of the status information of the individual ODB indicators received in the user subscription profile.

Optionally, the status information for the individual ODB indicators received in the user subscription profile remains unaltered after initiation of barring by the ODB initiator.

According to the invention in another aspect, there is provided a user database for storing one or more user subscription profiles in a mobile telecommunications network. Each user subscription profile associated with services implemented in one or more network domains and comprising a plurality of individual Operator Determined Barring indicators, ODBs, and respective status information, for the services associated with the user subscription profile. The user database comprises storage means, which may be a memory, configured to store a user subscription profile, a master ODB indicating barring for a plurality of the services associated with the user subscription profile, and master ODB status information. The user database comprises a transmitting means, which may be a transmitter, configured to transmit the user subscription profile, the master ODB and the master ODB status information to a network node.

Optionally, the user database further comprises a receiving means, which may be a receiver, configured to receive, from a network node, a request for the user subscription profile. Optionally, the user database comprises a subscription profile determining means, which may be a subscription profile determiner, configured to determine the user subscription profile, the master ODB and the master ODB status information corresponding to the request and to control the transmitter to transmit the determined user subscription profile, the master ODB and the master ODB status information to the network node.

Optionally, the master ODB indicates barring for all services associated with the user subscription profile.

Optionally, the receiver is configured to receive update information for master ODB and/or master ODB status information originating from a network operator. Optionally, the user database further comprises a master ODB updater configured to update in the memory the master ODB and/or the master ODB status information based on the received update information.

Optionally, the master ODB updater is further configured to control the transmitter to transmit the updated master ODB and/or the updated master ODB status information to a network node.

Optionally, the user database further comprises a service determiner configured to determine one or more services in use by a user and to control the transmitter to transmit the updated master ODB and/or the updated master ODB status information to a network node corresponding to the determined services.

According to the invention in another aspect, there is provided a method for use in a user database for storing one or more user subscription profiles in a mobile telecommunications network. Each user subscription profile is associated with services implemented in one or more network domains and comprising a plurality of individual Operator Determined Barring indicators, ODBs, and respective status information, for the services associated with the user subscription profile. The method comprises storing, in a memory, a user subscription profile, a master ODB indicating barring for a plurality of the services associated with the user subscription profile, and master ODB status information. The method comprises transmitting, by a transmitter, the user subscription profile, the master ODB and the master ODB status information to a network node.

Optionally, the method further comprises receiving, by a receiver, a request for the user subscription profile. Optionally, the method further comprises determining, by a subscription profile determiner, the user subscription profile, the master ODB and the master ODB status information corresponding to the request. Optionally, the method further comprises controlling, by the subscription profile determiner, the transmitter to transmit the determined user subscription profile, the master ODB and the master ODB status information to the network node.

Optionally, the master ODB indicates barring for all services associated with the user subscription profile.

Optionally, the method further comprises receiving, by the receiver, updated information for master ODB and/or master ODB status information originating from a network operator. Optionally, the method further comprises updating in the memory, by a master ODB updater, the master ODB and/or the master ODB status information based on the received update information.

Optionally, the method further comprises controlling the transmitter, by the master ODB updater, to transmit the updated master ODB and/or the updated master ODB status information to a network node.

Optionally, the method further comprises determining, by a service determiner, one or more services in use by a user. Optionally, the method further comprises controlling the transmitter, by the service determiner, to transmit the updated master ODB and/or the updated master ODB status information to a network node corresponding to the determined services.

According to the invention in another aspect, there is provided a provisioning gateway for use in a mobile telecommunications network. The mobile telecommunications network comprises a user database for storing one or more user subscription profiles, each user subscription profile associated with services implemented in one or more network domains and comprising a plurality of individual Operator Determined Barring indicators, ODBs, and respective status information, for the services associated with the user subscription profile. The provisioning gateway comprises a receiving means, which may be a receiver, configured to receive a user subscription profile originating from a network operator, a master ODB indicating barring for a plurality of the services associated with the user subscription profile and master ODB status information. The provisioning gateway comprises a transmitting means, which may be a transmitter, configured to transmit the user subscription profile, the master ODB and the master ODB status information to a user database.

Optionally, the provisioning gateway is further configured to receive update information for master ODB and/or master ODB status information originating from a network operator, and wherein the transmitter is further configured to transmit the update information to the user database.

According to the invention in another aspect, there is provided a method for use in a provisioning gateway for use in the mobile telecommunications network. The mobile telecommunications network comprises a user database for storing one or more user subscription profiles, each user subscription profile associated with services implemented in one or more network domains and comprising a plurality of individual Operator Determined Barring indicators, ODBs, and respective status information, for the services associated with the user subscription profile. The method comprises receiving, by a receiver, a user subscription profile originating from a network operator, a master ODB indicating barring for a plurality of the services associated with the user subscription profile, and master ODB status information. The method comprises transmitting, by a transmitter, the user subscription profile, the master ODB and the master ODB status information for the master ODB to a user database.

Optionally, the method further comprises the receiver receiving update information for master ODB and/or master ODB status information for the master ODB originating from a network operator. Optionally, the method further comprises the transmitter transmitting the update information to the user database.

According to the invention in another aspect, there is provided a computer program comprising instructions which, when executed on at least one processor, cause the at least one processor to carry out any of the methods described above.

According to the invention in another aspect, there is provided a carrier containing the computer program above, wherein the carrier is one of an electronic signal, optical signal, radio signal, or non-transitory computer readable storage medium.

DETAILED DESCRIPTION

Generally disclosed herein are methods and apparatus to allow an operator to apply and restore barring settings quickly across multiple services, within a mobile telecommunications network. In exemplary arrangements, the mobile telecommunications network may comprise a UDC architecture.

A master ODB is stored in a user database and is configured, when activated, to take precedence over existing individual ODB indicators irrespective of their status. The master ODB is configured to allow an operator to apply barring settings across multiple services a user has subscribed to without having to alter the status information for each individual ODB indicator. In exemplary network architectures, the activation of the master ODB barring settings does not overwrite the individual OBD status information. In an exemplary network architecture, when the master ODB barring settings are deactivated, the individual ODB barring settings are reinstated according to the status information.

Figure 1:
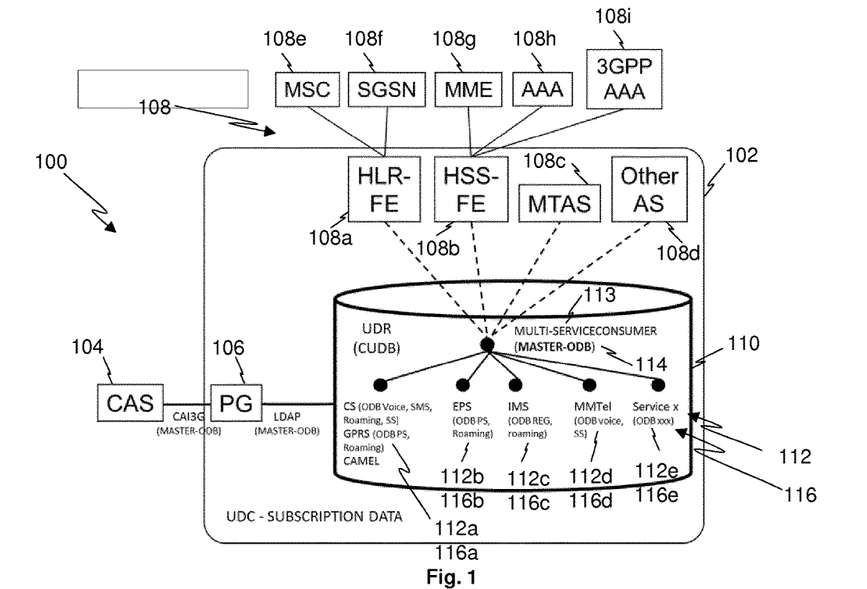
FIG. 1 shows an exemplary mobile telecommunications network that comprises a UDC architecture.

FIG. 1 shows an exemplary mobile telecommunications network 100 that comprises a UDC architecture 102. The UDC architecture 102 comprises a user database 110, a Customer Administration System (CAS) 104, a Provisioning Gateway (PG) 106, and a plurality of network nodes 108. A CAS may be similar to Business Support System (BSS) or Customer Relationship Management (CRM). In the exemplary UDC architecture 102 of FIG. 1, the user database 110 comprises a User Data Repository (UDR), and the plurality of network nodes comprise front end (FE) application nodes 108a-108d and a plurality of serving nodes 108e-108i. The FE nodes 108a-108d are configured to connect to the UDR 110 for access to the data contained therein.

In exemplary architectures, the FE nodes 108a-108d are in data communication with the plurality of serving nodes 108e-108i.

It is noted that data communication encompasses any form of communication between network nodes that allows the flow of data therebetween. Data communications may be over a wired or wireless medium.

In the exemplary UDR 110, one or more user subscription profiles 112 are stored. The exemplary user subscription profiles 112 shown in FIG. 1 comprise a CS, GPRS, Customised Applications for Mobile network Enhanced Logic (CAMEL) profile 112a, an EPS profile 112b, a IMS profile 112c, and an MMTEL profile 112d, as described above. However, other user subscription profiles 112e for additional services to which the user may subscribe may also be stored in the UDR 100.

Each user subscription profile 112 is associated with services implemented in one or more network domains. Further, each user subscription profile 112 comprises a number of individual ODB indicators 116 and respective status information. The individual ODB indicators 116 are independently operable such that barring settings can be applied to any combination of the individual user subscription profiles 112. The status information indicates whether the individual ODB is active or inactive.

In the exemplary UDR 110, each of the user subscription profiles 112 is associated with a single user via a connection with an entry 113 in the UDR 110 that aggregates the multiple services consumed by the user, for example called multi-service consumer entry. The multi-service consumer entry 113 is directly accessed by the plurality of FE nodes 108a-108d and comprises each user subscription profile. In FIG. 1, the plurality of FE nodes 108a-108d comprises a Home Locator Register FE (HLR-FE) 108a, a Home Subscriber Server FE (HSS-FE) 108b and a Multimedia Telephony Application Server (MTAS) 108c, although other ASs 108d may be connected to the UDR 110.

The term 'front end node' encompasses entities that access, but do not permanently store the data stored in the UDR 110 and handle application logic. The application type of the FE 108 is determined by the application logic handled by the FE 108. For example, the HLR-FE 108a shown in FIG. 1, may implement all or part of the HLR functionalities.

A user with access to different network domains and the services offered over these domains is assigned different subscription profiles in different network elements/domains. For example, a user with a 4G smartphone may be assigned the following subscription profiles: a CS subscription (voice, SMS) to access a CS network, a PS subscription to access a GPRS network and an EPS subscription to access an EPS network. The user might also be assigned additional subscription profiles such as: IMS subscription, MMTEL subscription, etc.

In exemplary UDC architectures, all of the subscription profiles 112 for each user are stored in the back-end UDR 110, whereas different application FEs 108a-108d are configured to access each applicable subscription profile 112. For example, the HLR-FE 108a may be configured to access the CS subscription profile 112a, whereas a HSS-FE 108b may be configured to access the EPS subscription profile 112b and the IMS subscription profile 112c.

In the exemplary UDC 100 of FIG. 1, the FE nodes 108a-108d are in data communication with the serving nodes 108e-108i. The serving nodes 108e-108i comprise an MSC 108e, an SGSN 108f, an MME 108g, an AAA 108h and a 3GPP AAA 108i. The MSC 108e and the SGSN 108f are in communication with the HLR-FE 108a. The MME 108g, the AAA 108h and the 3GPP AAA 108i are in communication with the HSS-FE 108b. In alternate embodiments, additional serving nodes 108e-108i may be connected with any of the FE nodes 108a-108d, as applicable.

In the exemplary UDR 110 of FIG. 1, the multi-service consumer entry 113 comprises a master ODB 114. The master ODB 114 may be in an active status, in which barring settings are applied to all of the subscription profiles 112, irrespective of the status information of the individual ODB indicators 116. The master ODB 114 may be in an inactive status, in which the barring settings are dependent on the status information of the individual ODB indicators 116. In alternate embodiments, the master ODB 114 may be associated with any combination of user subscription profiles 112.

The master ODB 114 may be applied to a user subscription profile 112 by an administrative action in the UDC 100. In exemplary UDC architectures, subscription profiles are managed using the PG 106 and the subscription information is updated and stored in the UDR 110 accordingly.

There are several possible realisations of the storage of the master ODB 114 within the UDR 110. A number of realisations allow a single read request of the master ODB 114 together with the rest of the user subscription profile for the corresponding service to be transmitted from the FE node 108a-d to the UDR 110. Other realisations may be possible where the master ODB 114 and the rest of the user subscription profile can be read in different queries transmitted from the FE node 108a-108d to the UDR 110.

Figure 2:
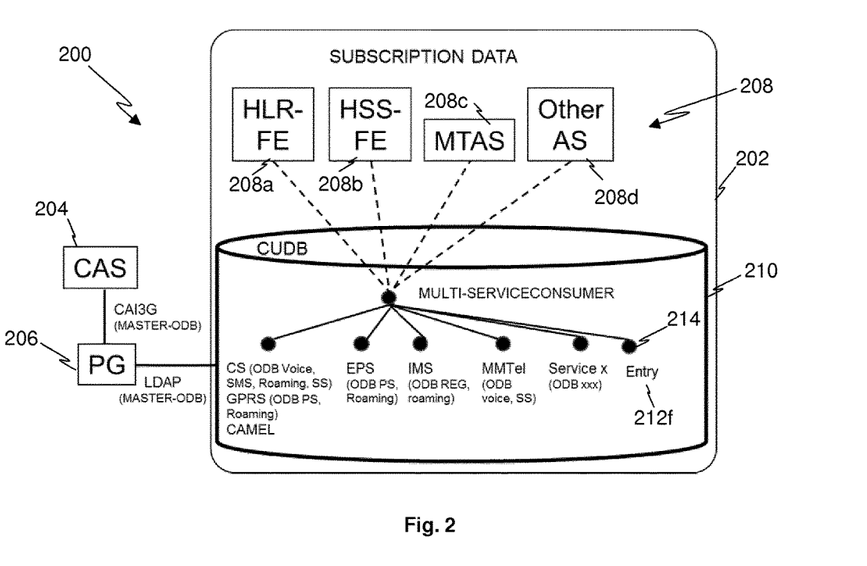
FIG. 2 shows an alternate mobile telecommunications network comprising a UDC architecture.

FIG. 2 shows an alternate embodiment of the mobile telecommunications network 200 comprising a UDC architecture 202. Note that FIG. 2 comprises features that are the same or similar to those discussed above in respect of FIG. 1. Not all of the features of FIG. 2 are, therefore, described here and the description of those features in relation to FIG. 1 is relied upon. Further, some of the features of FIG. 2 are therefore given like reference signs to those used in FIG. 1, except that they are prefixed with a "2" and this may indicate that these features are the same or similar to those in FIG. 1.

FIG. 2 depicts a possible realisation of the master ODB 214 within an entry 212f of the multi-service consumer entry 213, which contains information or data common for all services affecting the user. The entry 212f may be an entry that is related to the identities used by the user that already contains attributes related to features or services affecting multiple applications, for example, IMSI Changeover service. Alternately, the entry 212f may be a new entry, containing a new Objectclass with a master ODB 214 and/or attributes related to features or services affecting multiple applications.

In the exemplary architecture of FIG. 2, the PG 206 can read/write the master ODB 214 to/from the entry 212f directly. The FE nodes 208a-208d can read the master ODB 214 plus their corresponding application information by specifying the relevant application.

Figure 3:
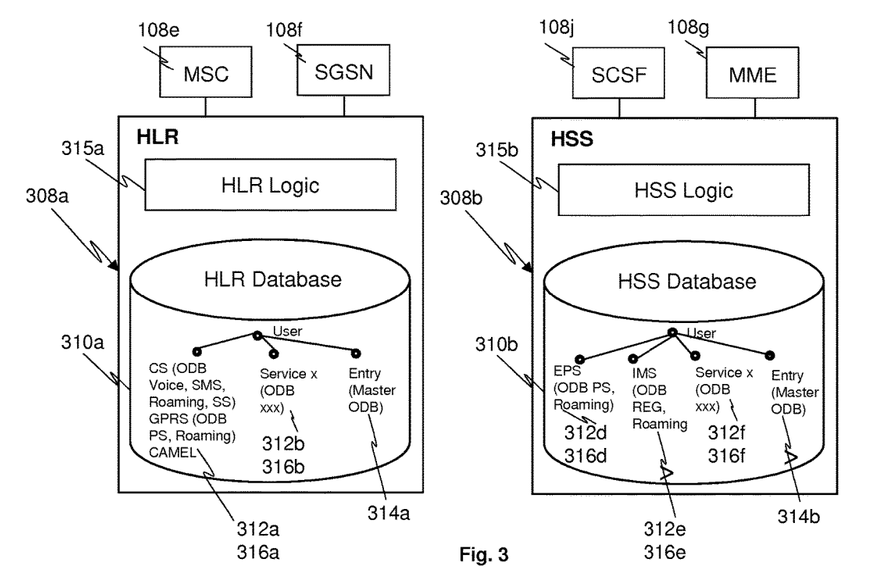
FIG. 3 shows an exemplary HLR and an exemplary HSS that may be used in a mobile telecommunications network.

FIG. 3 shows an exemplary HLR 308a and an exemplary HSS 308b that may be used in a mobile telecommunications network. The HLR 308a comprises a user database, or HLR database, 310a storing one or more user subscription profiles 312 and corresponding ODBs 316. The exemplary user subscription profiles 312 and ODBs 316 stored in the HLR database 310a comprise a user subscription profile 312a for CS, another user subscription profile 312b for additional services to which the user may subscribe and corresponding ODBs 316a, 316b. In addition, the HLR database 310a comprises a master ODB 314a.

The HSS 308b comprises user database, or HSS database, 310b storing user subscription profiles 312 and ODBs 316. The exemplary user subscription profiles 312 and ODBs 316 stored in the HSS database 310b comprise an EPS profile 112d, a IMS profile 112e, and an MMTEL profile 112f. In addition, the HSS database 310b comprises a master ODB 314b.

The HLR 308a comprises a HLR logic 315a. The HLR logic 315a is configured to communicate with the HLR database 310a and a plurality of serving nodes, such as an MSC 108e and a SGSN 108f. The HSS 308b comprises a HSS logic 315b configured to communicate with the HSS database 310b and a plurality of serving nodes, such as an SCSF 108j and a MME 108g.

Each of the HLR 308a and the HSS 308b may be served by a CAS and a PG, as discussed above in respect of FIGS. 1 and 2.

Figure 4:
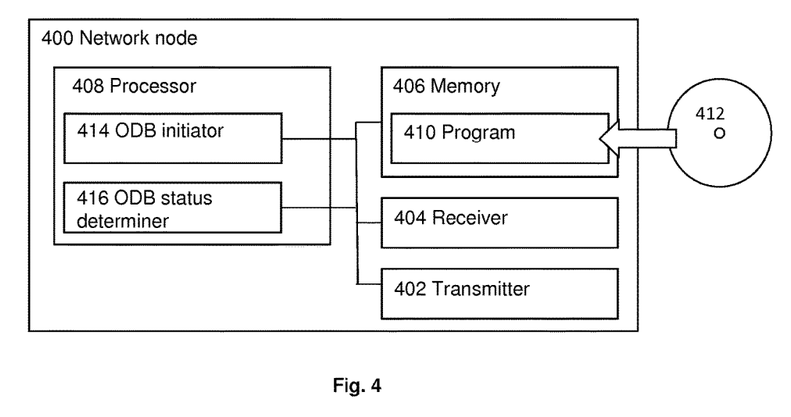
FIG. 4 shows a schematic representation of a network node.

FIG. 4 shows a schematic representation of a network node 400, which may be any one of the FE nodes 108a-108d, 208a-208d in the architecture of FIGS. 1 and 2, or any one of the HLR 308a and HSS 308b in the architecture of FIG. 3. In alternative arrangements, the network node may be one of the serving nodes 108e-108i shown in FIG. 1, or any one of the serving nodes 108e-108g and 108j in the architecture of FIG. 3. The network node 400 comprises a transmitter 402 and a receiver 404. The transmitter 402 and receiver 404 may be in data communication with other network entities such as UEs, servers and/or functions in a telecommunications network and are configured to transmit and receive data accordingly.

The network node 400 further comprises a memory 406 and a processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake one or more of the functions of an ODB initiator 414, and an ODB status determiner 416, as set out below.

Each of the transmitter 402 and receiver 404, memory 406, processor 408, ODB initiator 414, and ODB status determiner 416 is in data communication with the other features 402, 404, 406, 408, 410, 414, 416 of the network node 400. The network node 400 can be implemented as a combination of computer hardware and software. In particular, the ODB initiator 414 and ODB status determiner 416 may be implemented as software configured to run on the processor 408. The memory 406 stores the various programs/executable files that are implemented by a processor 408, and also provides a storage unit for any required data. The programs/executable files stored in the memory 406, and implemented by the processor 408, can include the ODB initiator 414 and ODB status determiner 416, but are not limited to such.

Figure 5:
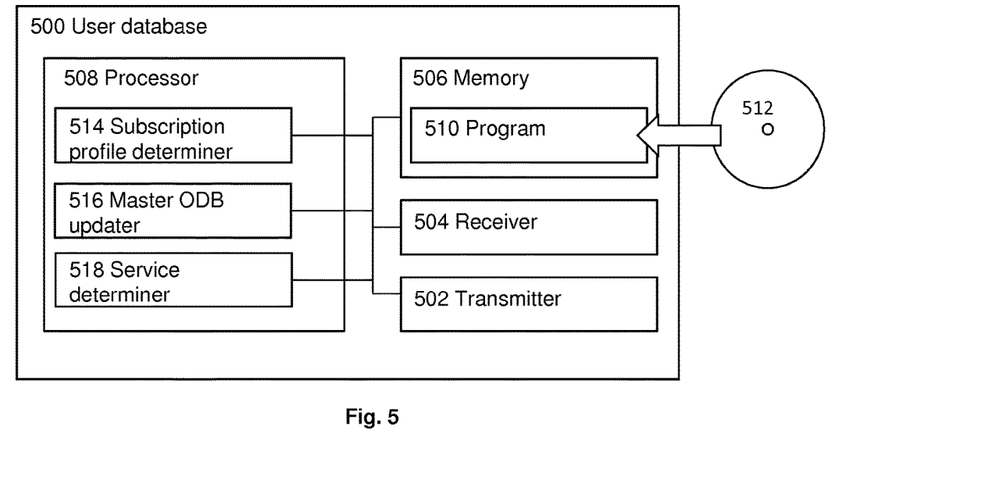
FIG. 5 shows a schematic representation of a user database.

FIG. 5 shows a schematic representation of a user database 500, which may be any one of the user databases 110 and 210 of FIGS. 1 and 2. In alternative arrangements, the user database 500 may be one of the user databases 310a and 310b shown in FIG. 3. The user database 500 comprises a transmitter 502 and a receiver 504. The transmitter 502 and receiver 504 may be in data communication with other network entities such as UEs, servers and/or functions in a telecommunications network and are configured to transmit and receive data accordingly.

The user database 500 further comprises a memory 506 and a processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake one or more of the functions of a subscription profile determiner 514, a master ODB updater 516, and a service determiner 518, as set out below.

Each of the transmitter 502 and receiver 504, memory 506, processor 508, subscription profile determiner 514, master ODB updater 516, and service determiner 518 is in data communication with the other features 502, 504, 506, 508, 510, 514, 516, 518 of the user database 500. The user database 500 can be implemented as a combination of computer hardware and software. In particular, subscription profile determiner 514, master ODB updater 516, and service determiner 518 may be implemented as software configured to run on the processor 508. The memory 506 stores the various programs/executable files that are implemented by a processor 508, and also provides a storage unit for any required data. The programs/executable files stored in the memory 506, and implemented by the processor 408, can include the subscription profile determiner 514, master ODB updater 516, and service determiner 518, but are not limited to such.

Figure 6:
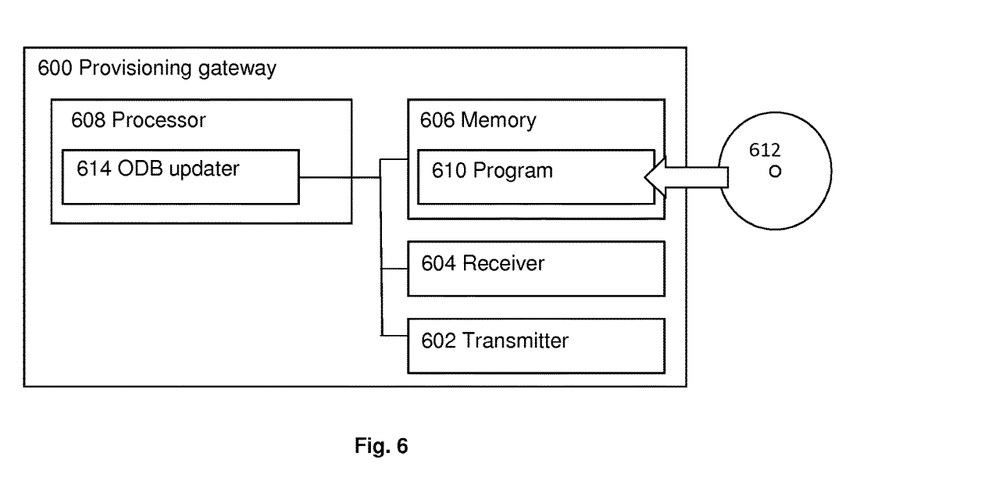
FIG. 6 shows a schematic representation of a provisioning gateway.

FIG. 6 shows a schematic representation of a provisioning gateway 600, which may be the provisioning gateway 106 of FIG. 1. The provisioning gateway 600 comprises a transmitter 602 and a receiver 604. The transmitter 602 and receiver 604 may be in data communication with other network entities such as UEs, servers and/or functions in a telecommunications network and are configured to transmit and receive data accordingly.

The provisioning gateway 600 further comprises a memory 606 and a processor 608. The memory 606 may comprise a non-volatile memory and/or a volatile memory. The memory 606 may have a computer program 610 stored therein. The computer program 610 may be configured to undertake the methods disclosed herein. The computer program 610 may be loaded in the memory 606 from a non-transitory computer readable medium 612, on which the computer program is stored. The processor 608 is configured to undertake one or more of the functions of an ODB updater 614, as set out below.

Each of the transmitter 602 and receiver 604, memory 606, processor 608, and ODB updater 614 is in data communication with the other features 602, 604, 606, 608, 610, 614 of the provisioning gateway 600. The provisioning gateway 600 can be implemented as a combination of computer hardware and software. In particular, the ODB updater 614 may be implemented as software configured to run on the processor 608. The memory 606 stores the various programs/executable files that are implemented by a processor 608, and also provides a storage unit for any required data. The programs/executable files stored in the memory 606, and implemented by the processor 608, can include the ODB updater 614, but are not limited to such.

Figure 7:
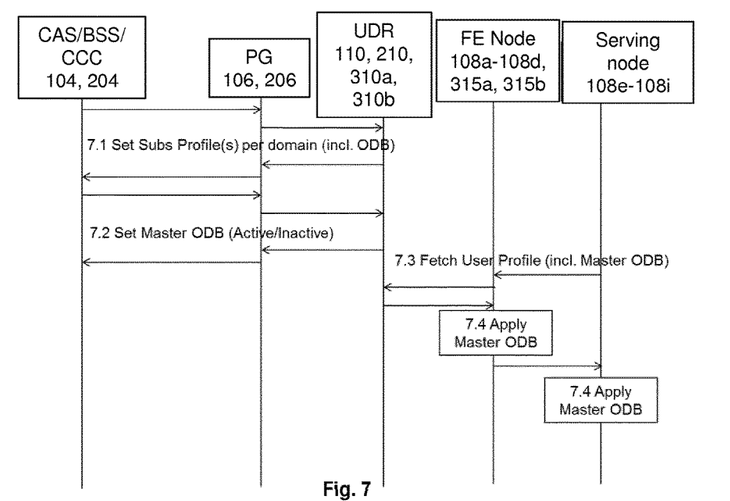
FIG. 7 shows a signalling diagram of the provisioning and implementation of a master ODB.

FIG. 7 shows a signalling diagram of the provisioning and implementation of a master ODB 114. Steps 7.1 and 7.2 relate to provisioning the user subscription profiles 112, master ODB 114, 214 and master ODB status information in the user database 500. Steps 7.3 and 7.4 relate to the initiation/implementation of the master ODB 114, 214. The steps are described below.

7.1 The CAS/BSS/CCC and PG 600 provision user subscription profiles 112 in the user database 500. The CAS/BSS/CCC provides user subscription profiles 112 to the PG 600 and the PG 600 transmits the user subscription profiles 112 to the user database 500. Each user subscription profile 112 applies to services in a network domain and comprises a number of individual ODB indicators 116, wherein each individual ODB indicator 116 indicates a specific barring, with a status information indicating the ODB is in an active or inactive state for the network domain. The user database 500 acknowledges the user subscription profiles 112 to the PG 600, which transmits a corresponding acknowledgement to the CAS/BSS/CCC.

7.2 The CAS/BSS/CCC provides a master ODB 114, 214 and master ODB status information to the PG 600 and the PG 600 transmits the master ODB and the master ODB status information to the user database 500. The master ODB 114, 214 indicates barring for a plurality of the services associated with a user subscription profile 112. The master ODB status information indicates whether the master ODB 114, 214 is active or inactive. The user database 500 acknowledges the master ODB and master ODB status information to the PG 600, which transmits a corresponding acknowledgement to the CAS/BSS/CCC.

The step of setting the initial value for the master ODB 114, 214 may be decoupled from the step of providing, by the provisioning gateway 600, of the user subscription profiles 112 in the user database 500, as described in step 7.1. In alternative embodiments, the step of setting the initial value for the master ODB 114, 214 may be a part of step 7.1. For example, the setting of the master ODB 114, 214 may be a part of the provisioning of any of the user subscription profiles 112, defined for the user in the user database 500 either explicitly (active or inactive) or implicitly (with a default value set to inactive if not explicitly indicated in the provisioning order).

7.3 When initiating/implementing the master ODB 114, 214, one of a serving node 108e-108j or a FE node 108a-108d obtains information indicative of the master ODB 114, 214 and the master ODB status information and a user subscription profile 112 for a user from the user database 500. The user subscription profile 112 obtained at the serving node 107 may include the master ODB 114, 214 and master ODB status information. Alternatively, the user subscription profile 112 may be stored separately from the master ODB 114, 214 and master status information in the user database 500 and may be retrieved separately from the user database 500.

In exemplary mobile telecommunications networks 100, 200, the user database 500 may be part of a UDC architecture comprising a UDR 110 and a plurality of network nodes 400 that may be the FE nodes 108a-108d, 208a-208d or serving nodes 108e-108i, as described above. In other exemplary arrangements, the network node 400 may comprise the user database 500, 310a, 310b and may be one of a HSS 308b, HLR 308a or AS. Where the network node 400 is, for example, any one of the HLR 308a and the HSS 308b, the network node 400 may also comprise an application logic module 315a, 315b, which may also be termed FE nodes.

In the exemplary method of FIG. 7, if the network node 400 is the serving node 108e-108i, the transmitter 402 transmits to an FE node 108a-108d, 208a-208d a request for a user subscription profile 112. The FE node 108a-108d, 208a-208d receives the request and transmits a further request to the user database 500. The request and further request may each be a request for a user subscription profile 112, and the request and/or further request may or not include a request for a master ODB 114, 214 and master ODB status information. The user database 500 receives the further request and a subscription profile determiner 514 determines the user subscription profile 112, master ODB 114, 214 and master ODB status information relating to the further request. The subscription profile determiner 514 retrieves the determined data from a memory 506 and controls a transmitter 502 to transmit the data to the FE node 108a-108d, 208a-208d.

7.4 The FE node 108a-108d, 208a-208d transmits the information indicative of the master ODB 114, 214 and the master ODB status and a user subscription profile 112 to the network node 400 (in this case, serving node 108e-108i). The ODB status determiner 416 of the network node 400 determines whether the master ODB 114, 214 is active based on the received master ODB status information. If the master ODB 114, 214 is active, the ODB initiator 414 initiates barring according to the master ODB 114, 214 for the plurality of services to which the master ODB 114, 214 relates. The barring according to the master ODB 114, 214 may imply applying the barring indicated by all the individual ODB indicators in the user subscription profile, and is initiated irrespective of the received status of the individual ODB indicators in the user subscription profile 112.

In alternative arrangements, the network node 400 may be the FE node 108a-108d, 208a-208d. In such arrangements, the step 7.3 comprises a request being transmitted from the network node 400 directly to the user database 500 and receiving the information indicative of the master ODB 114, 214 and the master ODB status and a user subscription profile 112 in response. In such arrangements, the ODB initiator 414 in the network node 400 (in this case, the FE node 108a-108d, 208a-208d) may initiate barring, if the master ODB is active, by controlling the transmitter 402 to transmit to the serving node 108e-108i, individual ODB indicators to be invoked at the serving node with status information set to active for the plurality of services associated with the user subscription profile 112. In such arrangements, the serving node need not be adapted to accommodate the master ODB 114, 214, as it is receiving individual ODB indicators and status information. Alternatively, the ODB initiator 414 may be configured to initiate barring, if the master ODB is active, by controlling the transmitter 402 to transmit the master ODB 114, 214 to the serving node 107. In addition, the ODB initiator 414 may be configured to initiate barring, if the master ODB is active, by applying barring for all individual ODB indicators to be invoked at the network node.

In each of the above arrangements, the original individual ODB indicators 116 and corresponding status information from the user subscription profile 112 may remain unaltered. Therefore, the network can easily return to the original individual ODB indicator 116 barring.

If the master ODB 114, 214 is inactive, the ODB initiator 414 initiates the specific barring for the received individual ODB indicators 116 with status active in the user subscription profile 112.

Once the user subscription profile(s) 112 have been provisioned and an initial setting of the master ODB 114 has been applied, the master ODB can be activated or deactivated at any time by the transmission of an appropriate status update message originating from the network operator. The update information may be transmitted to the user database 500 by the PG 600.

In exemplary methods and apparatus, there are no validation interactions between the setting of the master ODB 114, 214 and the status values of the individual ODB indicators 116 in the different user subscription profiles 112. This means that when the master ODB 114, 214 is activated, the status values of the individual ODB indicators are not modified.

If the user is registered or attached in the network over any subscribed domain when the barring settings of the master ODB 114, 214 are initiated, the updated subscription information may be transferred to the network node 108 configured to implement the master ODB 114, 214 in the corresponding domain(s) where the user is registered/attached to, for example a Visitor Location Register (VLR), SGSN, MME and/or 3GPP AAA).

Figure 8:
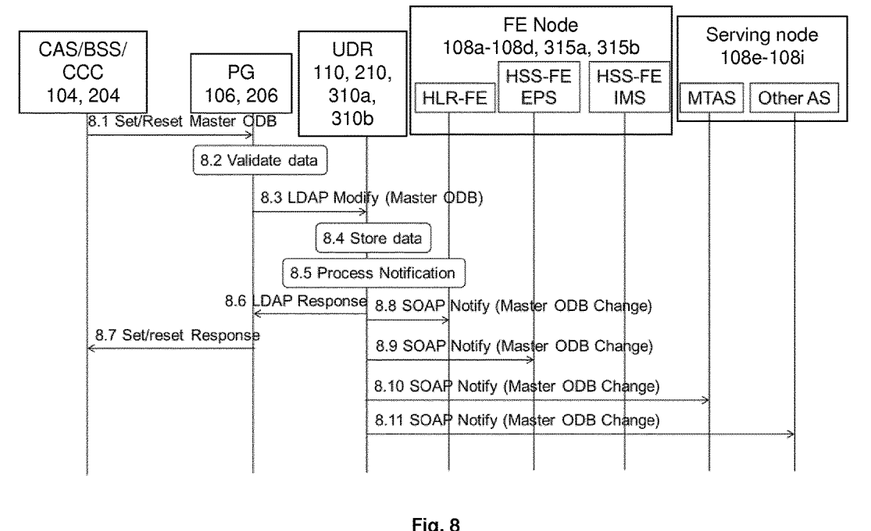
FIG. 8 shows a signalling diagram of the initiation and/or resetting of a master ODB and master ODB status information, while a user is registered or attached in a network over any subscribed domain.

FIG. 8 shows a signalling diagram of the initiation and/or resetting of a master ODB and master ODB status information, while the user is registered or attached in the network 100 over any subscribed domain. The notifications are sent by the user database 500, which may have been updated by a network operator via a PG 600. The steps are described below.

8.1 The CAS/BSS/CCC 104, 204 transmits to the PG 600 an update information for a master ODB 114, 214, and/or updated master ODB status information originating from a network operator. The update information may indicate barring for all services or for a different plurality of services. The update information may indicate a different master ODB status information.

8.2 The update information is received by the receiver 604 of the provisioning gateway 600. The updated master ODB 114, 214 and/or updated master ODB status information data is then validated at the PG 600.

8.3 The transmitter 602 of the PG 600 transmits the update information to the user database 500. The receiver 502 of the user database 500 receives the update information. In exemplary mobile telecommunications networks, the user database 500 may be part of a UDC architecture 102, 202 comprising a UDR 110, 210 and a plurality of network nodes 400 that may be the FE nodes 108a-108d, as described above. In other exemplary arrangements, the network node 400 may comprise the user database 310a, 310b and may be one of a HSS 308b, HLR 308a or AS. Where the network node 400 is, for example, any one of the HLR 308a and the HSS 308b, the network node 400 may also comprise an application logic module 315a, 315b, which corresponds to a standalone FE.

8.4 The master ODB updater 516 of the user database 500 updates the master ODB 114, 214 and master ODB status information in the memory 506 of the user database 500 based on the information received from the PG 600. The updated master ODB 114, 214 and/or the updated master ODB status information is stored at the user database 500.

8.5 The master ODB updater 516 identifies the network nodes 400 that need to be notified of the updated master ODB 114, 214 and/or the updated master ODB status information.

8.6 The user database 500 acknowledges the master ODB and master ODB status information update to the PG 600 with an LDAP response.

8.7 The transmitter 602 of the PG 600 transmits a corresponding acknowledgement to the CAS/BSS/CCC.

8.8-11 The master ODB updater 516 of the user database 500 controls the transmitter 502 of the user database 500 to transmit information identifying the updated master ODB 114, 214 and/or the updated master ODB status information to a network node 400, which may be an FE node 108a-108d or a serving node 108e-108i. Steps 8.8-8.11 comprise the transmission of the updated master ODB 114, 214 and/or the updated master ODB status information to a HSS-FE EPS, a HSS-FE IMS, an MTAS, and any other AS.

In the exemplary embodiment of FIG. 8, the transmitter 502 of the user database 500 transmits the updated master ODB 114, 214 and/or the updated master ODB status information to all of the network nodes 400. In alternative embodiments, a service determiner 518 of the user database 500 may determine the services in use by a user, and control the transmitter 502 of the user database 500 to transmit the updated master ODB 114, 214 and/or the updated master ODB status information to the network nodes 400 corresponding to the determined services.

When the update information is received at the applicable network nodes 400, the master ODB 114, 214, master ODB status information and user subscription profiles 112 stored at the network node 400 are updated and/or the master ODB is initiated by the ODB initiator 414. For example, the HLR-FE 108a may use a MAP Insert Subscriber Data message to transmit the updated master ODB status information to the MSC 108e and/or SGSN 108f. The HSS-FE 108b may use S6a Diameter IDA/IDR commands to transmit the updated master ODB status information to the MME 108g, or may use SWx Diameter PPR/PPA commands to transmit the updated master ODB status information towards the 3GPP AAA 108i.

The MAP Insert Subscriber Data operation and the S6a/SWx Diameter IDR/PPR request messages may carry a new information element or AVP respectively with the status information of the master ODB 114, 214.

Although in the above description of FIG. 8 reference is made to the updating of the master ODB 114, 214, the signalling diagram is equally applicable to the setting of the master ODB 114, 214.

The barring required by the master ODB 114, 214 may be implemented at any network node 400, which may be an FE node 108a-108d, 208a-208d or a serving node 108e-108j, depending on the traffic case.

Figure 9:
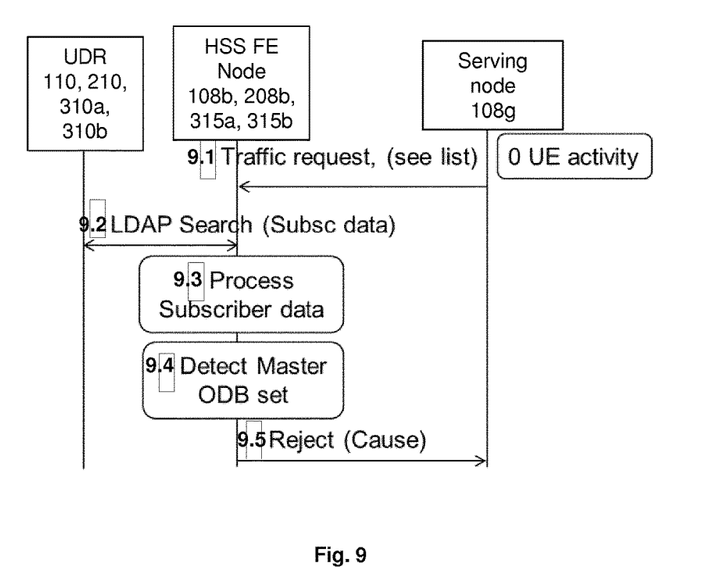
FIG. 9 shows a signalling diagram for initiation/implementation of a master ODB in a network node.

FIG. 9 shows a signalling diagram for initiation/implementation of a master ODB 114, 214 in a network node 400 wherein the network node is an FE 108a-108d, 208a-208d and an HSS-FE 108a, 208a in the specific example of FIG. 9, and wherein the master ODB 114, 214 is implemented at the FE node 108a-108d, 208a-208d.

9.1 After UE activity requesting a service, the serving node 108e-108i (MME 108g) transmits a traffic request to the network node 400 (HSS-FE 108a).

9.2 The network node 400 then transmits a request for an LDAP search to the user database 500 to obtain data indicative of the user subscription profile 112, the master ODB 114, 214 and the master ODB status. The subscription profile determiner 514 of the user database 500 determines the applicable user subscription profile 112, the master ODB 114, 214 and the master ODB status and controls the transmitter 502 to transmit the applicable user subscription profile 112, the master ODB 114, 214 and the master ODB status to the network node 400.

9.3 The network node 400 (HSS-FE 108a) verifies that the received data corresponds to the received traffic request.

9.4 The ODB status determiner 416 determines the status of the master ODB 114, 214.

9.5 If the status is active, the ODB initiator 414 initiates the master ODB 114, 214 by implementing the master ODB 114, 214 and controlling the transmitter 402 to transmit a negative response to the requested procedure to the serving node 108e-108i, and an appropriate error indication included in the response provokes the cancellation of the operation.

The same or a similar method as shown in FIG. 9 may be used for the other FE nodes 108a-108d, 208a-208d.

The master ODB 114, 214 for barring a plurality of subscribed services may be initiated/implemented in a serving node 108e-108i, such as a MSC/VLR, SGSN, MME, and 3GPP AAA Server during the following procedures:

At reception of Send Info for Outgoing Call in MSC-VLR and Mobile Originated Short Messages (MO SM) in SGSN (as if it was Barring of Outgoing Calls or MO SM)

In MSC-VLR at reception of Supplementary Service (SS) activity: interrogation; invocation; control of Public Land Mobile Network (PLMN) specific supplementary services; processing unstructured SS data (as if it was Barring of Supplementary Services Access)

In SGSN and MME at reception of Activate Packet Data Protocol (PDP) Context, Attach Request, and Packet Data Network (PDN) Connectivity Request (as if it was Barring of Mobile Station (MS) initiated PDP context activation)

In MSC-VLR at reception of Closed User Group (CUG) Outgoing Call request (as if it was Interactions of Operator Determined Barring with Supplementary Services, CUG Outgoing Calls)

In MSC-VLR at reception of Call Barring Outgoing Call request (as if it was Interactions of Operator Determined Barring with Supplementary Services, Call Barring Outgoing Calls)

In 3GPP AAA at reception of Wireless Access Point Name (W-APN) (re-) authorization (as if it was Barring of interworked packet services in Interworking Wireless Local Access Network (I-WLAN))

In 3GPP AAA at reception of W-APN (re-)authorization (as if it was Barring of W-APN Activation in I-WLAN)

In 3GPP AAA at reception of W-APN (re-)authorization **Authorization Accept and Routing Policy Download (as if it was Barring of public Internet access in I-WLAN)

In SGSN and MME at reception of PDN Connectivity Request (as if it was Barring of Access to All Except Some Specific APNs)

If the master ODB 114, 214 is active, the corresponding serving node will return a negative response to the requested procedure with an appropriate error indication.

Figure 10:
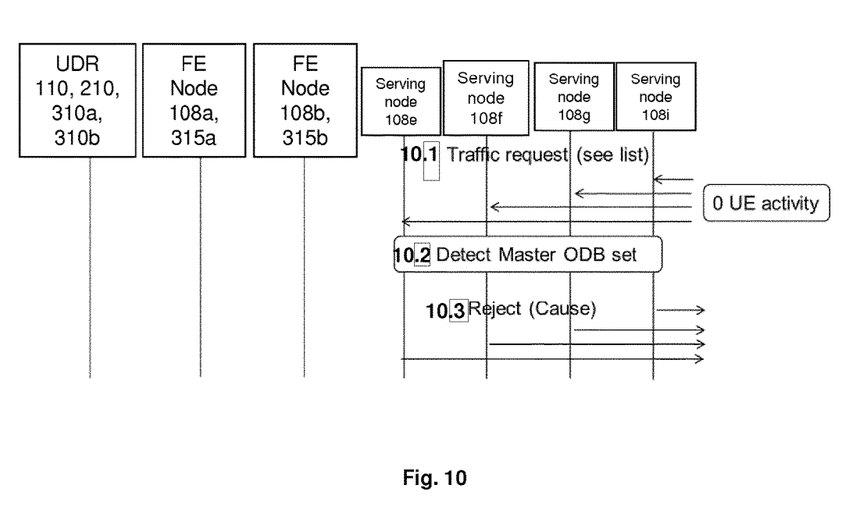
FIG. 10 shows a signalling diagram for initiation/implementation of a master ODB in a serving node.

FIG. 10 shows a signalling diagram for initiation/implementation of a master ODB 114, 214 in a network node 400, wherein the network node is a serving node 108e-108i, and wherein the master ODB 114, 214 is implemented at the serving node 108e-108i.

10.1 After UE activity requesting a service, the UE transmits a traffic request to the network node 400 (serving node 108e-108i).

10.2 The ODB status determiner 416 determines the status of the master ODB 114, 214. This data may have been sent to the network node 400 by an FE node 108a-108d, 208a-208d.

10.3 If the status is active, the ODB initiator 414 initiates the master ODB 114, 214 by implementing the master ODB 114, 214 and controlling the transmitter 402 to transmit a negative response to the requested procedure to the UE, and an appropriate error indication provokes the cancellation of the operation.

The same or a similar method as shown in FIG. 10 may be used for the other serving nodes 108e-108i.

Exemplary methods and apparatus disclosed herein require serving nodes 108e-108i to be aware and support the Master ODB 114, 214. In other words, in addition to the applicable ODBs currently defined in TS 23.015 [3], serving nodes 108e-108i may be configured to receive also the new master ODB information and invoke it accordingly when required.

In other exemplary methods and apparatus, initiation/implementation of the master ODB 114, 214 at serving nodes 108e-108i is possible without those serving nodes 108e-108i or any associated interfaces being adapted. This may be done by the network node, such as e.g. the FE node 108a-108d, 208a-208d, the HLR 308a, or the HSS 308b, initiating the master ODB 114, 214 by transmitting a set of existing individual ODB indicators defined in TS 23.015 [3] with their statuses adapted to correspond to the master ODB status information.

FE nodes 108a-108d, 208a-108d may provide ODB information to serving nodes 108e-108i according to the mechanisms and procedures defined in TS 23.015 [3]. However, the values for the existing individual ODB indicators will be set in the communication towards serving nodes 108e-108i depending on the master ODB status information.

When the master ODB 114, 214 is not active, the serving nodes 108e-108i are provided with the existing individual ODB indicators defined in TS 23.015 [3] and stored in the mobile telecommunications network 100. However, when the master ODB is active, the FE nodes 108a-108d, 208a-208d initiate the master ODB in the serving nodes 108e-108i by providing a modified status value of the individual ODB indicators in the communication towards the serving nodes 108e-108i.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node for controlling implementation of services in a mobile telecommunications network, the mobile telecommunications network comprising a user database for storing at least one user subscription profile, each user subscription profile associated with services implemented in at least one network domain and comprising a plurality of individual Operator Determined Barring indicators, ODBs, and respective status information, for the services associated with the user subscription profile, the network node comprising:
   a receiver configured to receive, from the user database, a user subscription profile, a master ODB indicating barring for a plurality of the services associated with the user subscription profile and master ODB status information;
   an ODB status determiner configured to determine that the master ODB is active based on the received master ODB status information; and
   an ODB initiator configured to initiate, for the plurality of services, barring for all individual ODB indicators in the user subscription profile, irrespective of the received status information for the individual ODB indicators.

2. The network node according to claim 1, further comprising a transmitter configured to transmit a request for the user subscription profile, to the user database, wherein the receiver is configured to receive the user subscription profile, the master ODB and the master ODB status information in response to the transmitted request.

3. The network node according to claim 1, wherein the master ODB indicates barring for all services associated with the user subscription profile.

4. The network node according to claim 1,
   wherein the receiver is configured to receive the user subscription profile, the master ODB and the master ODB status information from one of: an application front end node of a UDC architecture, a HSS a HLR, a MTAS; and other AS; and
   wherein the ODB initiator is configured to initiate barring by implementing all individual ODB indicators in the user subscription profile that are invoked at the network node, as if they were active, irrespective of the status information of the individual ODB indicators received in the user subscription profile.

5. The network node according to claim 1, wherein the ODB initiator is configured such that the status information for the individual ODB indicators received in the user subscription profile remains unaltered after initiation of barring by the ODB initiator.

6. A method for use in a network node for controlling implementation of services in a mobile telecommunications network, the mobile telecommunications network comprising a user database for storing at least one user subscription profile, each user subscription profile associated with services implemented in at least one network domain and comprising a plurality of individual Operator Determined Barring indicators, ODBs, and respective status information, for the services associated with the user subscription profile, the method comprising:
   receiving, by a receiver from the user database, a user subscription profile, a master ODB indicating barring for a plurality of the services associated with the user subscription profile, and master ODB status information;

determining, by a master ODB status determiner, that the master ODB is active based on the received master ODB status information; and initiating, by an ODB initiator, for the plurality of services, barring for all individual ODB indicators in the user subscription profile irrespective of the received status information for the individual ODB indicators.

7. The method according to claim 6, further comprising transmitting, by a transmitter of the network node, a request for the user subscription profile, to the user database, wherein the receiver is configured to receive the user subscription profile, the master ODB and the master ODB status information in response to the transmitted request.

8. The method according to claim 6 wherein the master ODB indicates barring for all services associated with the user subscription profile.

9. The method according to claim 6, wherein the user database is a User Data Repository, UDR, of a User data Convergence, UDC architecture, and wherein the network node is an application front end node of the UDC architecture.

10. The method according to claim 6, wherein the network node comprises the user database as an internal database, and wherein the network node is one of a Home Subscriber Server, HSS; a Home Locator Register, HLR; a Multimedia Telephony Application Server, MTAS; and other Application Server, AS.

11. The method according to claim 6, wherein the ODB initiator initiates barring by controlling a transmitter to transmit to a serving node, all individual ODB indicators in the user subscription profile that are invoked at the serving node, with new respective statuses set to active, irrespective of the status information of the individual ODB indicators received in the user subscription profile.

12. The method according claim 6, wherein the ODB initiator initiates barring by controlling a transmitter to transmit, towards a serving node, the master ODB.

13. A user database for storing at least one user subscription profile in a mobile telecommunications network, each user subscription profile associated with services implemented in at least one network domain and comprising a plurality of individual Operator Determined Barring indicators, ODBs, and respective status information, for the services associated with the user subscription profile, the user database comprising:

a memory configured to store a user subscription profile, a master ODB indicating barring for a plurality of the services associated with the user subscription profile, and master ODB status information; and a transmitter configured to transmit the user subscription profile, the master ODB and the master ODB status information to a network node.

14. The user database according to claim 13, further comprising:

a receiver configured to receive, from a network node, a request for the user subscription profile; and a subscription profile determiner configured to determine the user subscription profile, the master ODB and the master ODB status information corresponding to the request and to control the transmitter to transmit the determined user subscription profile, the master ODB and the master ODB status information to the network node.

15. The user database according to claim 13, wherein the master ODB indicates barring for all services associated with the user subscription profile.

16. The user database according to claim 13, wherein the receiver is configured to receive update information for at least one of the master ODB and the master ODB status information originating from a network operator; and the user database further comprising a master ODB updater configured to update in the memory the at least one of the master ODB and the master ODB status information based on the received update information.

17. A method for use in a user database for storing one or more user subscription profiles in a mobile telecommunications network, each user subscription profile associated with services implemented in at least one network domain and comprising a plurality of individual Operator Determined Barring indicators, ODBs, and respective status information, for the services associated with the user subscription profile, the method comprising:

storing, in a memory, a user subscription profile, a master ODB indicating barring for a plurality of the services associated with the user subscription profile, and master ODB status information; and transmitting, by a transmitter, the user subscription profile, the master ODB and the master ODB status information to a network node.

18. The method according to claim 17, further comprising:

receiving, by a receiver, a request for the user subscription profile;

determining, by a subscription profile determiner, the user subscription profile, the master ODB and the master ODB status information corresponding to the request; and controlling, by the subscription profile determiner, the transmitter to transmit the determined user subscription profile, the master ODB and the master ODB status information to the network node.

19. The method according to claim 17, wherein the master ODB indicates barring for all services associated with the user subscription profile.

20. The method according to claim 17, further comprising receiving, by the receiver, updated information for at least one of the master ODB and the master ODB status information originating from a network operator; and updating in the memory, by a master ODB updater, the at least one of the master ODB and the master ODB status information based on the received update information.

* * * * *